July 10, 1934.  H. E. MUCHNIC  1,966,039
JOINT FORMING MEANS FOR RETURN BENDS AND THE LIKE
Filed Jan. 21, 1933  2 Sheets-Sheet 1
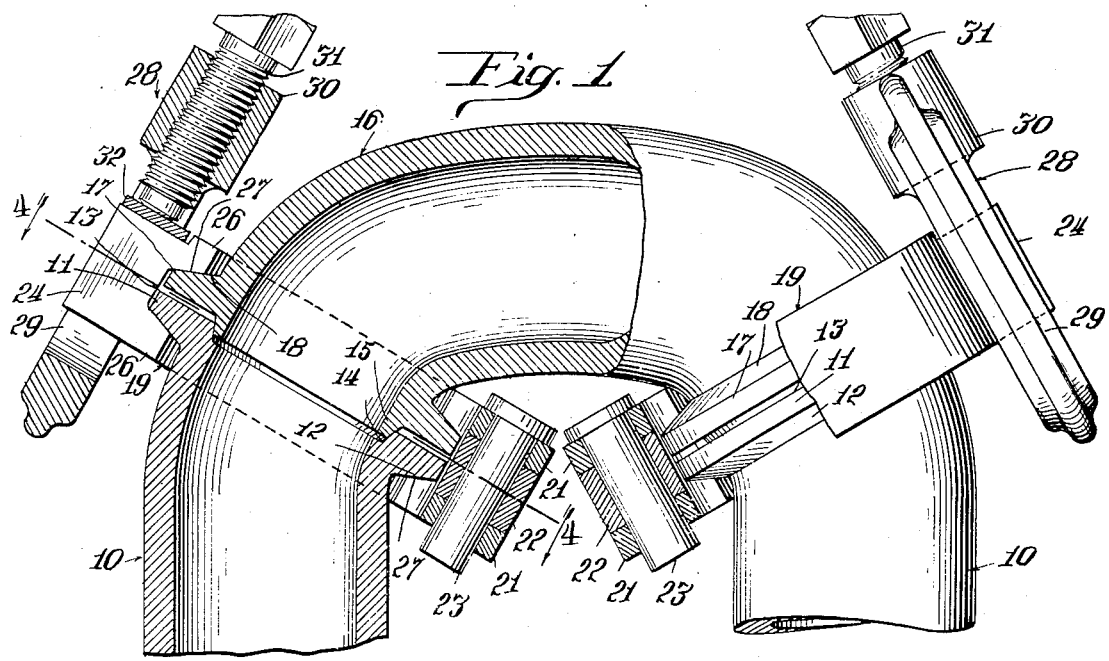
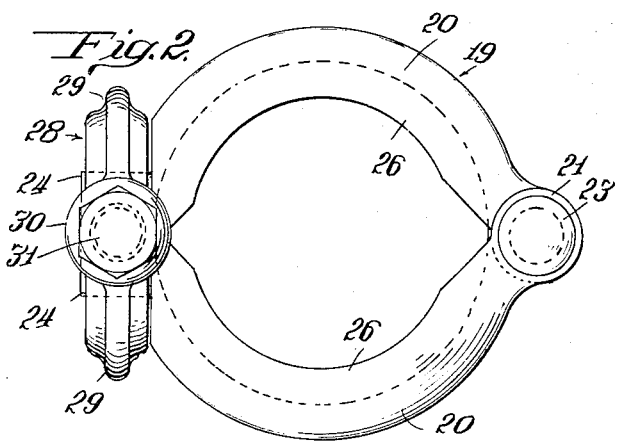
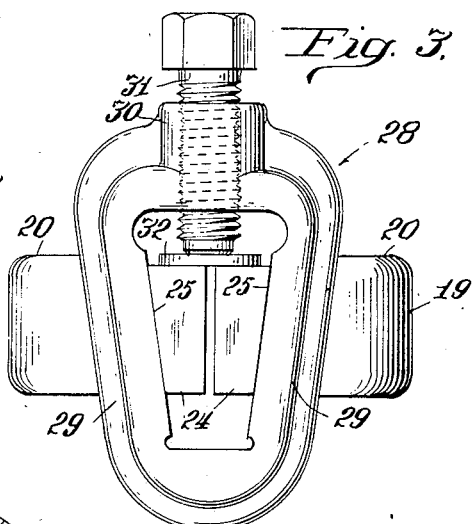
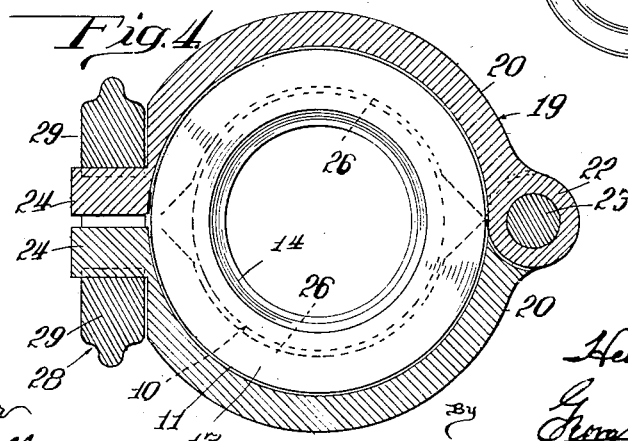
Inventor
Henry E. Muchnic,
George Heidman
Attorney.

July 10, 1934.  H. E. MUCHNIC  1,966,039
JOINT FORMING MEANS FOR RETURN BENDS AND THE LIKE
Filed Jan. 21, 1933 2 Sheets-Sheet 2
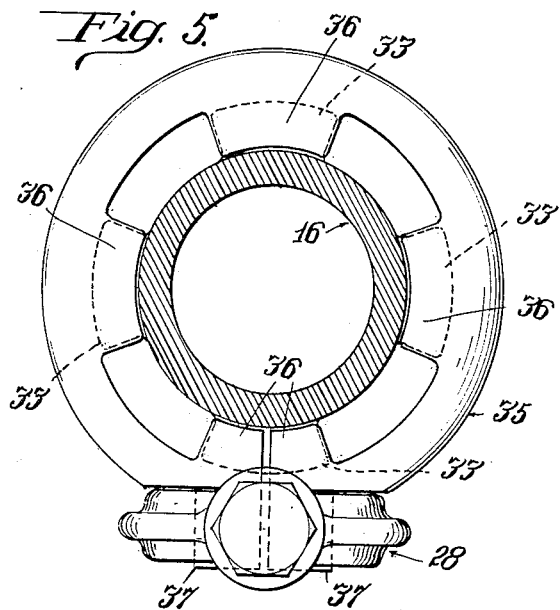
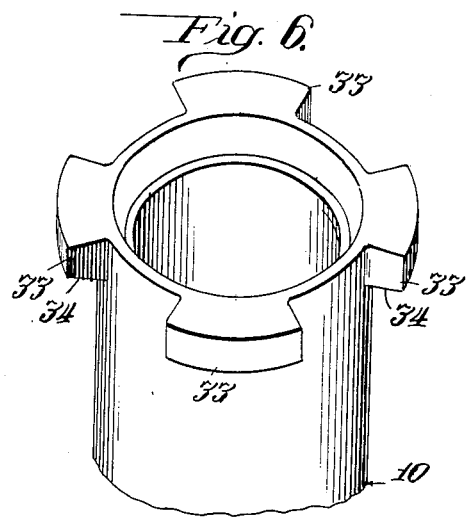
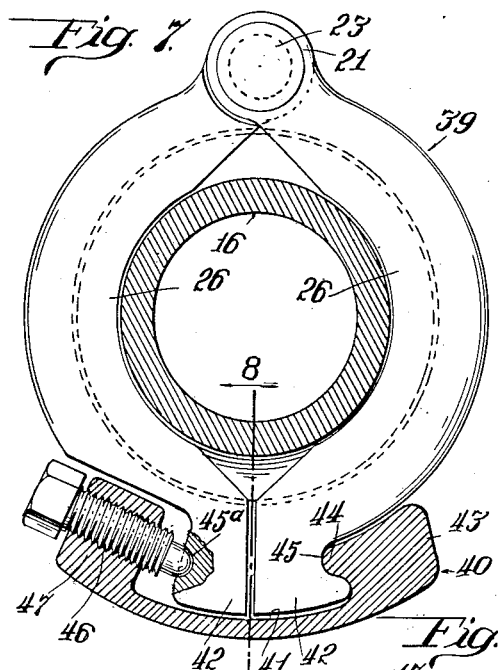
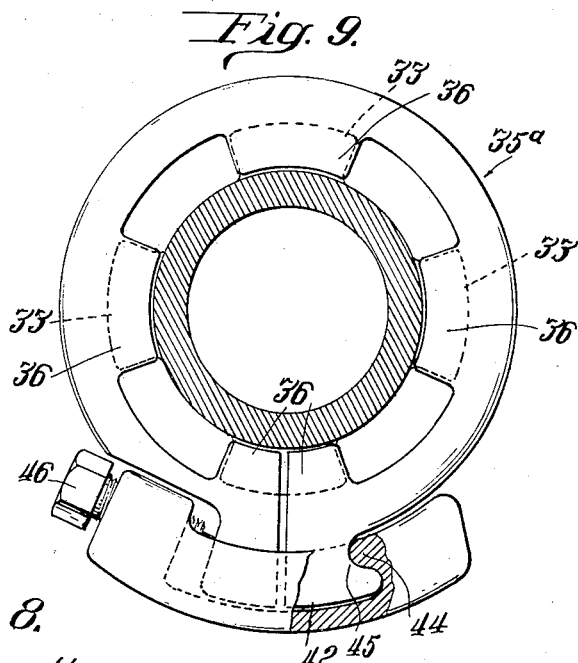
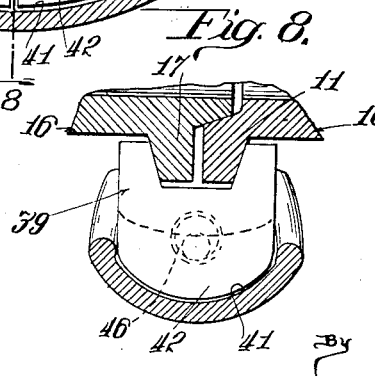
Witnesses
Milton Lenoir
Inventor
Henry E. Muchnic
George Heidman
By Attorney Patented July 10, 1934

1,966,039

UNITED STATES PATENT OFFICE 1,966,039

JOINT FORMING MEANS FOR RETURN BENDS AND THE LIKE

Henry E. Muchnic, Atchison, Kans., assignor to The Locomotive Finished Material Company, Atchison, Kans., a corporation of Kansas Application January 21, 1933, Serial No. 652,852

6 Claims. (Cl. 285—20)

My invention relates to means for producing pressure resisting joints, as for example in the return bends of oil stills; although equally well adapted, as can readily be seen, for providing suitable joints between any conduit sections; this application relating to modifications or specific forms of the general type of conduit joint effecting means described in my co-pending application filed December 24th, 1932, and bearing Serial Number 648,784.

My invention has for its object the provision of means whereby the joint may be readily effected and as easily disjoined or taken apart; the present invention involving, in conjunction with the adjacent and specially constructed ends of two conduit sections, a pair of elements consisting of a clamp receiving member and a regulable pressure producing member, whereby the conduit sections are forced into fluid tight and pressure resisting relation.

My invention, its purposes and advantages will be readily comprehended from the following detailed description of the drawings, wherein:

Figure 1 shows my invention applied to a return bend, wherein one end of the return bend and a pipe section with my joint forming means are in section, while the other end is in elevation with a portion of the joint forming means broken away and in section.

Figure 2 is a plan view of the joint effecting means employed in Figure 1.

Figure 3 is a side elevation thereof as viewed from the left of Figure 2.

Figure 4 is a cross sectional view taken substantially on the line 4—4 of Figure 1 as viewed by the arrows.

Figure 5 is a sectional plan, illustrating the invention with a conduit and a single piece clamp member which are provided with interrupted flanges.

Figure 6 is a perspective view of a conduit section showing the interrupted type of flange of Figure 5.

Figure 7 is a sectional plan of the type of clamp member shown in Figure 2 applied to a conduit section with a modified form of clamp contracting means in cross section.

Figure 8 is a cross section taken substantially on the line 8—8 of Figure 7.

Figure 9 is a sectional plan illustrating the modified form of contracting means applied to a single piece clamp member and conduit section with interrupted flanges.

Although my improved joint forming means may be employed for effecting any conduit or pipe joint, it is especially adapted for use in connection with what are known as stream line return bends as employed in oil stills where the oil under pressure is made to flow through the various banks of tubes connected by the return bends.

It is therefore essential that a pressure resisting joint be provided, which, with my invention, permits the use of the stream line type of return bends being employed whereby the difficulties of turbulence and pressure reduction will be overcome; at the same time enabling the return bends to be readily removed to permit the necessary frequent cleaning of the tubes.

For purposes of exemplification, therefore, I have shown my invention applied to a return bend consisting of a pair of conduit sections 10, 10, the ends whereof are each provided with a preferably annular flange 11 having the lower tapered side 12; that is to say the flange tapers toward its outer perimeter and preferably with a flat outer or upper side 13.

For the purpose of effecting a fluid tight joint, the orifice of the pipe section 10 is shown flared or beveled at 14 to receive a tapered extension or lip 15 formed at the orifice of the return bend section 16, which at its end is also provided with an annular flange 17 corresponding to the flange 11 of the pipe section 10, with the upper surface of flange 17 also tapered toward its outer perimeter as shown at 18.

Where the conduit and return bend sections are formed with the tapered lip and beveled seat the use of a gasket for effecting a fluid tight joint is not necessary; it being understood, however, that my invention is equally well adapted to a butt end joint with a suitable intervening gasket.

Cooperating with the flanges 11 and 17 is my improved clamp member 19 consisting of similar sections or halves 20, 20, each provided with an apertured lobe 21, between which is shown an apertured spacer block 22; the apertures of the lobes and block receiving the pivot or hinge pin 23, which thus permits the two sections 20, 20 to be spread or opened so that the clamp member may be placed about the flanges 11 and 17 of the conduit sections 10 and 16.

The clamp member 19 is of comparative width, namely of width somewhat greater than the combined thicknesses of the flanges 11 and 17. The opposite or free end of each clamp section 20 is provided with an outwardly disposed lug or end 24, beveled transversely on one side so as to taper from top to bottom of the lug as shown at 25 in Figure 3.

Each clamp section 20 is provided with a pair of parallel flanges 26, 26 on its inner perimeter at the upper and lower sides; and the inner opposing faces of the two flanges 26 are tapered toward the inner perimeters thereof as shown at 27 in Figure 1. The tapered surfaces 27, 27 correspond to the tapered surfaces 12 and 18 of the conduit flanges 11 and 17; the flanges 26 of both clamp sections 20, 20 forming an annular groove or socket for reception of the flanges 11 and 17 of the conduit sections.

With the clamp member 19 consisting of two hingedly connected sections, it is apparent that the flanges may all be made continuous throughout as shown.

It is evident that with the tapered surfaces on the respective flange portions, when the clamp member 19 is properly disposed about the flange portions of the conduits, a contraction of the clamp member will cause the conduit sections to be drawn toward each other into fluid tight relation.

In order to induce a contraction of the clamp member, I have provided clamp ends receiving means whereby great contracting force can be exerted and the clamp member immovably held in place.

This means, as disclosed in the first four figures of the drawings, involves a yoke member 28 which is more clearly shown in Figure 3, and adapted to receive and extend about the ends of the clamp, wherein the member is shown consisting of a single piece member of more or less oblong construction tapering or having its narrowest dimensions at the bottom or at the end. That is to say, the side walls 29, 29 of the yoke slope toward each other at the bottom of the yoke, with the opening between these walls at one end of the opening sufficient to freely receive the ends or lugs 24, 24 of the two sections 20 of the clamp member.

The upper end of the yoke member 28 is provided with an enlargement or boss portion 30 which is provided with a threaded aperture to receive the screw-bolt 31 adapted to extend entirely through the boss portion 30.

I prefer to employ a hardened disc or washer 32 of size sufficient to extend across or engage with the tops of both ends or lugs 24, 24 of the clamp sections 20, 20.

With the ends or lugs 24, 24 tapered toward the bottom as shown and with the side walls 29, 29 of the yoke member also sloping toward each other at the bottom of the yoke 28, it is apparent that when bolt 31 is screwed down on washer 32, the yoke member 28 will be drawn upwardly on the ends or lugs 24, 24 of the clamp and consequently will tightly draw the clamp sections 20, 20 together and cause the tapered flanges of the clamp member 19 to effect tight clamping relation with the flanges of the conduits, which in turn draws and holds the conduit sections in pressure resisting relation with each other.

In the first figures of the drawings I have shown continuous flanges on the pipe sections and the clamp member and therefore with the clamp member made of hingedly connected sections which permits application of the clamp.

In Figures 5 and 6 I show the application of my invention to a single piece clamp and, therefore, a clamp member having interrupted flanges in conjunction with pipe sections having interrupted flanges to enable the clamp member to be inserted onto one of the pipe sections before the two pipe sections are placed in juxtaposition.

The respective pipe sections to be joined are each provided with the outwardly disposed flange portions 33, spaced predetermined distances apart and with the faces which are disposed toward the pipe tapered as shown at 34 in a manner similar to the tapers or flanges 11 and 17 of Figure 1.

The clamp member 35 comprises a continuous split ring provided on its inner perimeter with a plurality of spaced apart flange portions 36 arranged in annular rows adjacent the upper and lower sides of the ring so as to provide a space between the two annular rows adapted to receive the flange portions 33 of two aligned pipe sections therebetween. The opposing faces of the flange portions 36 of the two rows are tapered toward the free ends of these portions to match the tapered faces of the pipe flange portions; and the spacing between the flange portions 36 in the same circular row is such that the flange portions 33 of the pipe sections may pass therethrough. This permits the clamp member 35 to be slipped onto the ends of the pipes; and upon slight rotation of the clamp member the flange portions 33 of the pipes will be disposed between the two circular rows of flange portions 36 of the clamp member.

The split side of the clamp member, on each side of the split, is provided with an outwardly disposed lug 37, which, like the ends or lugs 24 of the construction shown in Figure 3, is made with a tapered side.

This split clamp member 35 is contracted or forced into pipe clamping condition by the lug encircling yoke member 28, which is similar to that shown in Figure 3 and heretofore described, wherein one end of the member 28 is provided with a regulable pressure producing bolt 31.

In Figures 7 and 8 I disclose a modified form of clamp contracting element employed with a clamp member 39 similar to that of Figure 2, having continuous flanges 26, 26 and intended for use with pipe sections also having continuous flanges 11 and 17 like in Figure 1.

These figures show a modification of the clamp controlling means comprising a clamp-lug receiving yoke member 40, of somewhat arcuate formation and in order to give the member 40 greater strength I prefer also to form the member 40 somewhat U-shape in cross-section; that is to say, provide it with a concaved inner side as shown at 41, adapted to receive the outwardly extended ends or lugs 42 of the clamp member 39, which, with this type of yoke member 40, may have straight sides as shown. The yoke member 40 is not only made as shown for purposes of strength, but also to prevent the member 40 from extending too far outwardly from the clamp member, because when used in oil still return bend installations the question of space is often quite an item.

The ends of the yoke member are disposed toward one side of the member so as to extend over the lugs or ends 42; and one end 43 of member 40 is shown provided with a boss or enlargement 44.

The side of one of the lugs or ends 42 of the clamp member 39 and preferably adjacent to its base is provided with a socket 45, to receive the boss 44, while the socket 45ᵃ in the companion lug 42 receives the end of the compression bolt 46 threaded in a tapped opening in the opposite end 47 of the yoke member 40.

With the side walls of members 40 disposed on opposite sides of the lugs 42, it is also apparent that the yoke member 40 will be held against swinging movement.

The member 40 is preferably given the arcuate formation shown in Figures 7 and 9 so as to extend closer to the side of the clamp member and also to ensure greater clamping force with the enlargement 44 and the contacting end of bolt 46 arranged below the transverse axes of lugs 42, 42.

In Figure 9, I show the application of the yoke member 40 to the split or single piece type of clamp member 35ᵃ similar to that shown in Figure 5 and therefore a clamp member provided with the interrupted flanges to be used with pipe sections also provided with interrupted flanges as in Figure 6 and heretofore described.

The clamp member 35ᵃ is in all respects similar to member 35 in Figure 5, except that the sides of the lugs are identically like the lugs 42, 42 of the clamp member 39 of Figure 7, with sockets to receive the enlargement 44 at one end of yoke member 40 and the end of the set screw or bolt 46 at the other end; the clamp 35ᵃ having an interrupted flange as shown at 36 to coact with the interrupted flange 33 of the pipe or conduit section.

With the constructions shown in the drawings, it will be seen that contraction of the clamp members is not produced by screw-bolts which would be under tension, but is obtained by means wherein the regulable elements or screw-bolts are under compression, and hence a more satisfactory and secure construction provided.

It is apparent that great contracting force can be exerted on the clamp members without subjecting the screw-threads to a tension strain and hence clamping means are provided wherein expansion of the regulable means will tend to tighten the joint; whereas a joint wherein a bolt under tension is employed, the expansion tends to loosen the joint; and while I believe the constructions shown to be the simplest embodiments of my invention, modifications may be possible without, however, departing from the spirit of my invention.

What I claim is:

1. Joint forming means comprising, in combination with conduit sections provided with circumferentially disposed flanges; an encircling member having spaced apart flanges on the inner perimeter and outwardly extending lugs; and a yoke member formed to provide a lug receiving converging opening and provided with means whereby the lugs are forced toward the converging end of said opening and said encircling member contracted into conduit clamping condition.

2. Joint forming means comprising, in combination with conduit sections provided with circumferentially arranged tapered flanges and an encircling member provided on its inner perimeter with flanges tapered on their opposing faces and spaced apart to receive the flanges of two conduit sections therebetween and having outwardly extending lugs; a yoke member provided with a converging opening adapted to receive said lugs and provided with regulable means whereby relative movement between the yoke and said lugs is induced and the lugs forced toward the converging end of the opening.

3. Joint forming means comprising, in combination with conduit sections having circumferentially arranged tapered flanges; an encircling split member provided on its inner perimeter with a pair of parallely arranged flanges tapered on their opposing faces and spaced apart to receive the conduit flanges therebetween and having outwardly disposed lugs at opposite sides of the split; a yoke adapted to receive said lugs and having side walls converging toward one end of the yoke; and a screw member regulably associated with the larger end of the yoke and adapted to engage said lugs, whereby relative movement between the yoke and said lugs is induced and the latter forced toward the converging end of the yoke.

4. Joint forming means comprising, in combination with a pair of conduit sections provided adjacent their ends with circumferentially arranged tapered flanges; an encircling clamp composed of a pair of substantially semi-circular members provided with outwardly disposed lugs, the inner perimeters of said members each having a pair of spaced apart tapered flanges adapted to receive the conduit flanges therebetween; a yoke adapted to receive said lugs and having side walls converging toward one end of the yoke, while the larger end of the yoke has a tapped opening therethrough; and a screw-bolt threaded in said tapped opening and adapted to engage with said lugs, whereby inward screwing of the bolt causes the converging walls to draw the clamp-members together.

5. In joint forming means of the character described, a distensible pipe encircling element composed of a pair of members, each member provided with an outwardly disposed lug having a tapered side wall; a yoke member adapted to receive the outwardly disposed ends, the side walls of the yoke converging toward one end and matching the tapered sides of said lugs; and a screw member associated with the yoke and adapted to engage said lugs, whereby the latter are forced toward the converging end of the yoke and the clamping relation of said encircling element maintained.

6. Joint forming means comprising, in combination with a pair of conduit sections, each provided with circumferentially arranged interrupted flanges; encircling means adapted to be contracted, having spaced apart interrupted flanges on the inner perimeter and laterally extending lugs on the outer perimeter, and a yoke member provided with a converging opening for receiving a pair of lugs therein and provided with means at one end of said opening for forcing said lugs toward the converging end of said opening and thereby clamp the conduit sections together.

HENRY E. MUCHNIC.